United States Patent [19]
Takahashi et al.

[11] Patent Number: 4,628,259
[45] Date of Patent: Dec. 9, 1986

[54] MAGNETO RESISTIVE SENSOR FOR DETECTING MOVEMENT OF A ROTATING BODY

[75] Inventors: Tadashi Takahashi, Hitachi; Hiroshi Hayashida, Mito; Kunio Miyashita; Sadao Sekizawa, both of Hitachi, all of Japan

[73] Assignee: Hitachi, Ltd., Tokyo, Japan

[21] Appl. No.: 306,233

[22] Filed: Sep. 28, 1981

[30] Foreign Application Priority Data

Sep. 29, 1980 [JP] Japan .................. 55-134372
Oct. 9, 1980 [JP] Japan .................. 55-140502

[51] Int. Cl.$^4$ .................. G01B 7/14; G01R 33/02; H01L 41/12
[52] U.S. Cl. .................. 324/208; 324/252; 338/32 R
[58] Field of Search .............. 324/172, 173, 174, 207, 324/208, 252; 338/32 R; 340/669, 670, 671, 672

[56] References Cited

U.S. PATENT DOCUMENTS

| 4,024,458 | 5/1977 | Templin ................ 324/208 |
| 4,039,936 | 8/1977 | Jones et al. ............ 324/208 |
| 4,053,826 | 10/1977 | Wasawa et al. ......... 324/208 |
| 4,418,372 | 11/1983 | Hayashida et al. ...... 324/252 X |
| 4,429,276 | 1/1984 | Narimatsu ............. 324/252 |

FOREIGN PATENT DOCUMENTS 52-48379 4/1977 Japan .
53-120547 10/1978 Japan .
54-41335 7/1979 Japan .
54-115257 9/1979 Japan .

Primary Examiner—Ernest F. Karlsen
Assistant Examiner—Walter E. Snow
Attorney, Agent, or Firm—Antonelli, Terry & Wands

[57] ABSTRACT

The invention discloses a movement detecting device for detecting the movement state of a moving body such as a rotating body, in which a magnetic recording medium on which N and S magnetic poles are alternately recorded at a constant interval is fixed symmetrically with respect to a rotary shaft of a rotating body whose rotation state is to be detected, and an MR element comprising magnet-resistive elements is mounted at a fixed position relative to the magnetic recording medium so that the rotation state of the rotating body can be detected from variation of the values of resistance of the magnet-resistive elements caused by the rotation of the body. N and S poles are recorded on the magnetic recording medium with a small pole pitch P. The magnet-resistive elements are formed to have a width sufficiently smaller than the pole pitch. The magnet-resistive elements constitute a first group and a second group, the magnet-resistive elements of each group being disposed with an interval equal to the pole pitch or half the pole pitch. The magnet-resistive elements are disposed in such a manner that the interval between the groups is deviated from the pole pitch, whereby a circuit comprising these magnet-resistive elements can detect the rotation of the rotating body.

16 Claims, 16 Drawing Figures

MAGNETO RESISTIVE SENSOR FOR DETECTING MOVEMENT OF A ROTATING BODY

This invention relates to a movement detecting device for a moving body, and more particularly to a movement detecting device for detecting the movement position, movement direction and movement speed of a moving body using magnet-resistive metal elements, which pick up a magnetic signal recorded on a magnetic recording means fixed to the moving body.

In a prior art rotation detecting means for a rotating body, as disclosed in Japanese Patent Publication (Post-Examined) No. 41335/79 and Japanese Patent Publication (Laid-Open) No. 48379/79, a magnetic medium on which N and S poles are magnetized alternately at a constant interval is disposed with its center at the rotation axis of the rotating body, and two magnet-resistive elements disposed with an interval equal to half the pole pitch are mounted at fixed positions relative to the magnetic medium. The two magnet-resistive elements are connected in series, and a d.c. voltage is applied in order to pick up a signal related to the rotation state of the rotating body from a connection point of both magnet-resistive elements. Further, U.S. Pat. No. 4,039,936 discloses a rotation detecting means for a rotating body, in which a voltage dividing circuit is connected in parallel with a series circuit of the above-mentioned magnet-resistive elements to form a bridge circuit, and a signal related to the rotation state of a rotating body is taken out from this bridge circuit. Further, Japanese Patent (Laid-Open) No. 120547/78 discloses a rotation detecting means for a rotating body, in which two pairs of series circuits of the above-mentioned magnet-resistive elements are used to detect two rotation state signals with different phases. Still further, Japanese Patent (Laid-Open) No. 115257/79 discloses a similar means for detecting a multiplicity of signals with different phases by using a multiplicity of magnet-resistive elements.

These rotation detecting means for a rotating body are often applied to detection of the rotation speed of a motor, the rotation direction thereof and the rotation angle from a reference value when the motor-driven body is under drive control. In order to obtain an accurate drive control, it is necessary to detect the rotation states of the rotating body, that is, the rotation speed, rotation direction and rotation angle. For this purpose, it is required that N and S poles recorded on a magnetic recording medium that is mounted on the rotating body are formed at a small interval. Further, the small interval is inevitable for miniaturization of the means. Therefore, magnetic resistive elements for discriminating and detecting magnetic poles with such a small interval must have a sufficiently small width compared to the pitch of the magnetic poles in the moving direction of the magnetic recording body. These requirements are disclosed in none of the cited references. No construction satisfying these requirements is shown therein.

Requirement of a small size means is satisfied by miniaturization of a pick-up including a magnet-resistive element, that is, a small construction of magnet-resistive effect metal elements (hereinafter referred to as an MR element). Therefore, it will be convenient, if terminal parts from the magnet-resistive element to a detecting circuit is constructed in such a manner that they are adjacent to each other. Further, if magnet-resistive elements, conductor parts for mutual connection thereof and terminal parts are to be formed on an insulator substrate, it is preferable that MR elements be formed with the same material at one time by the evaporation method, etc. in order to have improvement in mass production and cost reduction. In this case, since the conductor parts cause a magnet-resistive effect, some countermeasure would be necessary to avoid any influence of magnetic poles recorded on the magnetic recording medium. However, the cited references describes nothing on these points.

Particularly, an MR element having a plurality of bridge circuits formed therein to detect plural signals has a large shape, since the number of magnet-registive elements is large. Because of this, an irregularity of evaporation can appear easily, which causes a variation in the characteristic of each bridge circuit. Moreover, simultaneous formation of all the elements becomes difficult. Thus, a problem degrading mass productivity arises. Another problem is that a large number of terminals make a complicated printing.

One object of this invention is to provide a moving detecting means for a moving body in which N and S magnetic poles are alternately recorded on a magnetic recording medium on the moving body thereby to detect accurately the movement state of the moving body.

Another object of this invention is to provide a movement detecting means for a moving body with a small size and good mass productivity.

In a movement detecting means for a rotating body according to this invention comprising a rotating body fixed to a magnetic recording medium and an MR element with three terminals mounted oppositely to the magnetic recording medium such that magnetic signals recorded with a minute interval on the magnetic medium can be taken out of a resistance variation of the MR element, the characteristic of the invention lies in the facts that two groups of first and second magnet-resistive elements with a width sufficiently smaller than the recording width of the magnetic signals as recorded on the magnetic recording medium and with an interval equal to the that of N and S poles are provided for forming a three terminal MR element; that the first and second magnetic elements of different groups are disposed at an interval equal to an odd multiples of a half the pitch of the N and S poles; and that all the magnet-resistive elements are arranged to be adjacent to the magnetic recording medium.

Another characteristic of this invention lies in the fact that, in the construction of a plurality of bridge circuits of plural magnet-resistive elements forming the MR elements, some of the magnet-resistive elements are arranged to form common arms of the bridge circuits.

These and other objects and advantages of this invention will become more apparent from the following detailed description made in conjunction with the accompanying drawings, in which.

Figure 1:
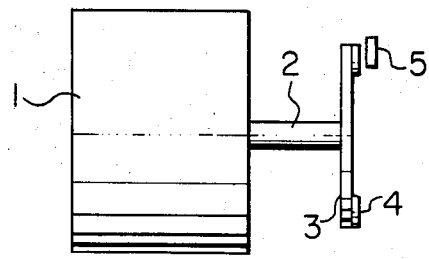
FIG. 1 is a diagram showing one example of the whole construction of this invention.
Figure 2:
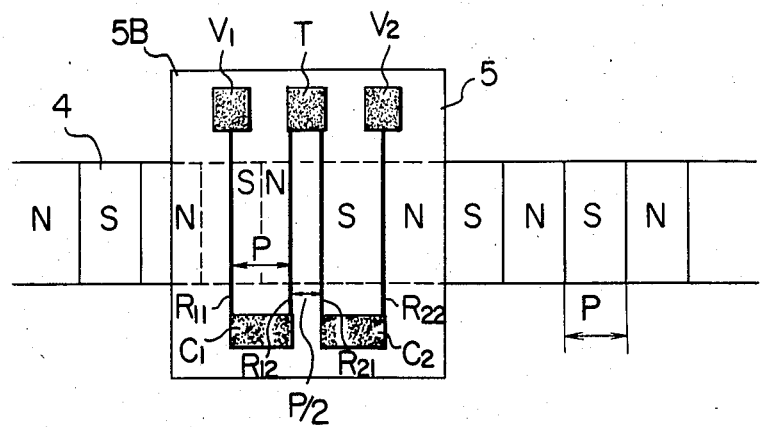
FIG. 2 is an explanatory diagram showing one embodiment of the main part of this invention.
Figure 3:
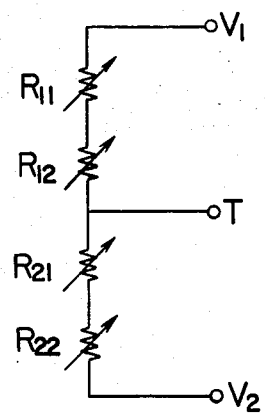
FIG. 3 is a diagram showing the circuit construction of FIG. 2.

In FIG. 1, a magnetic recording medium 4 with magnetic records is mounted on a rotary disk 3 fixed to a rotary shaft of a rotating body 1. An MR element 5 is mounted at a fixed position oppositely to the magnetic recording medium 4 with a small interval therebetween. The magnetic recording medium 4 may be formed either by adhering a magnetic tape or by attaching a magnetized magnetic substance. N and S poles are alternately recorded with an equal spacing therebetween. The MR element 5 has four magnet-resistive elements $R_{11}$, $R_{12}$, $R_{21}$ and $R_{22}$, as shown in FIG. 2. Each magnet-resistive element has a width sufficiently smaller than the pitch of N and S magnetic poles that are recorded on the magnetic recording medium. The elements $R_{11}$ and $R_{12}$, and $R_{21}$ and $R_{22}$, are connected in series with each other by low resistance parts $C_1$ and $C_2$, respectively, to form two groups of magnet-resistive elements, these groups are connected in series with each other by an additional low resistance part T. As shown in FIG. 3, the connection part T and low resistance parts $V_1$, $V_2$ at both ends form a three-terminal circuit. The MR element consists of magnet-resistive elements $R_{11}$, $R_{12}$, $R_{21}$ and $R_{22}$, and low resistive parts $C_1$, $C_2$, T, $V_1$ and $V_2$, which are formed by evaporating a ferromagnetic material such as permalloy on an insulator substrate 5B. The pattern is formed on one chip. Low resistance parts are realized by forming their widths sufficiently larger than those of the magnet-resistive elements. Therefore, the magnet-resistive elements and low resistance parts can be formed by the same material. Since the MR element can be fabricated by the same material at one time, the mass producibility is greatly improved. Furthermore, since the resistance of the parts other than those of the magnet-resistive elements can be neglected, the sensitivity of the MR element can be enhanced.

The intervals between the magnet-resistive elements $R_{11}$ and $R_{12}$, and $R_{21}$ and $R_{22}$, are shown to be equal to the pitch P between N and S poles which are recorded on the magnetic recording medium 4. However, the intervals may take any value that is an integer multiple of P. Although the magnet-resistive elements $R_{12}$ and $R_{21}$ are shown to be spaced by P/2, the interval between $R_{12}$ and $R_{21}$ may take any value that is an odd multiple of P/2. Therefore, the interval between the magnet-resistive elements of the $R_{11}$ and $R_{12}$ group and those of the $R_{21}$ and $R_{22}$ group becomes an odd integer multiple of P/2.

Figure 4:
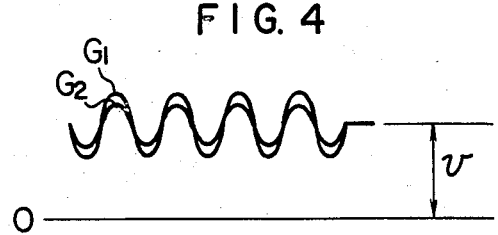
FIG. 4 shows output waveforms in the operation of the embodiment shown in FIG. 2.

The magnet-resistive elements decrease their resistances with an increase of the intensity of a magnetic field independently of the N and S poles. Therefore, the magnet-resistive elements $R_{11}$ and $R_{12}$ which are spaced by an integer multiple of P vary their resistances by the same value. On the other hand, the elements $R_{11}$ and $R_{21}$, or the elements $R_{12}$ and $R_{22}$ which are spaced by an odd integer multiple of P/2 vary their resistances with a phase difference of 180°. If a voltage is applied across the terminals $V_1$ and $V_2$ and the body 1 is rotating, an a.c. voltage as shown in FIG. 4 can be detected at the intermediate terminal T. In this figure, the interval between the magnetic recording medium and the MR element which gives a wave form $G_1$ is smaller than that which gives a wave form G2. As can be understood from FIG. 4, when the interval is varied, all the resistances vary in the same way. Thus, the center value of the output voltage at the intermediate terminal is not changed by the variation of the interval but kept at a constant value v. Only the amplitude of the a.c. voltage varies. Therefore, not only signal processing can be made stably through d.c. amplification but also accurate signal detection becomes possible even when the rotating body 1 stops.

Since the interval between the groups of magnet-resistive elements is made equal to an odd integer multiple of P/2, as mentioned before, magnet-resistive elements in each group vary their resistances alternately with the rotation of the rotating body 1. The rate of variation of the resistances is from 2 to 6%. Hence, the increment variation of the output voltage between the terminals $V_2$ and T is also from 2 to 6%.

Especially, since the three terminals are positioned adjacent on the same side, as shown in FIG. 2, printing of lead wires from the MR elements can be easily done. This serves also for miniaturization of the MR element.

Figure 5:
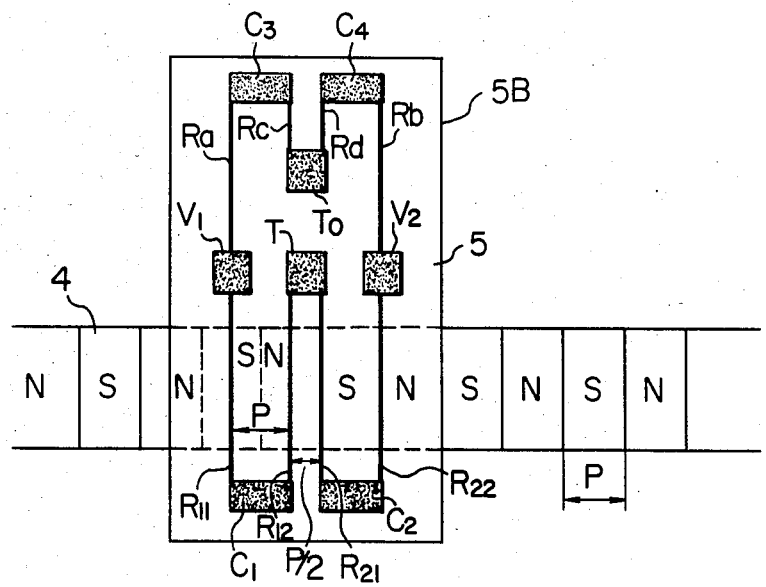
FIG. 5 is an explanatory diagram showing a modification of the embodiment shown in FIG. 2.
Figure 6:
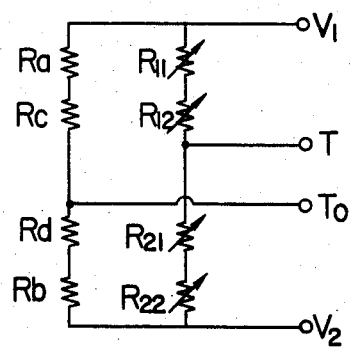
FIG. 6 is a diagram showing the circuit construction of the embodiment shown in FIG. 5.

FIG. 5 shows a modified example where the construction of FIG. 2 is made to be a bridge type. Namely, a series connection of resistive bodies $R_a$, $R_b$, $R_c$ and $R_d$ is connected across the power supply terminals $V_1$ and $V_2$, and resistive bodies are connected with each other by low resistance parts $C_3$, $C_4$ and T. These resistive bodies $R_a$, $R_b$, $R_c$ and $R_d$ and low resistance parts $C_3$, $C_4$ and $T_0$ are formed with the same material as the magnet-resistive elements. However, in order not to have any influence of the recorded poles one the magnetic recording medium, the resistive bodies $R_a$, $R_b$, $R_c$ and $R_d$ are positioned distant from the magnetic recording medium. The equivalent circuit of the construction of FIG. 5 is expressed by a bridge circuit, as shown in FIG. 6, where an output signal can be obtained between the terminals $T_0$ and T.

In FIG. 5, $R_c$, $R_d$ and $T_0$ may be omitted, and $C_3$ and $C_4$ may be formed in one united body as $T_0$.

Figure 7:
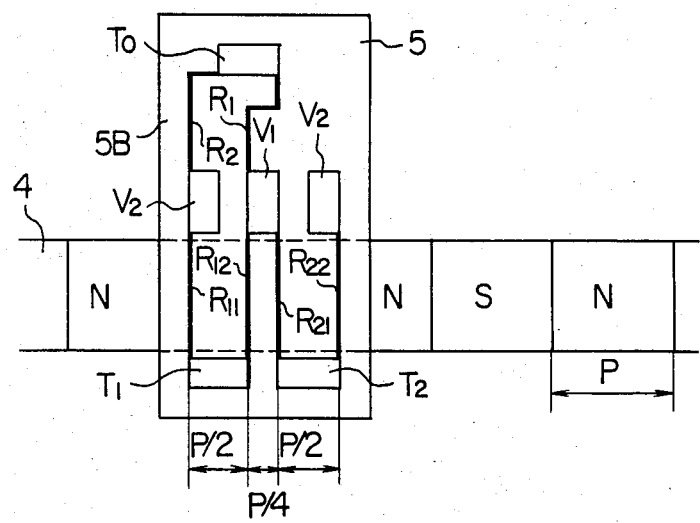
FIG. 7 is an explanatory diagram showing another embodiment of the main part of this invention.

Next, another example with two bridge circuits is shown in FIG. 7.

As an MR element 5, six thin film magnet-resistive elements $R_1$, $R_2$, $R_{11}$, $R_{12}$, $R_{21}$ and $R_{22}$ formed by a ferromagnetic material such as permalloy are disposed on a substrate 5B. $T_0$, $T_1$, $T_2$, $V_1$ and $V_2$ are terminals which form two bridge circuit with the magnet-resistive elements $R_1$ and $R_2$ as common sides. $V_1$ and $V_2$ are power supply terminals for the bridge circuits, and $T_0$, $T_1$ and $T_2$ are detection terminals. The magnet-resistive elements $R_1$ and $R_2$ serving as common sides are positioned distant from the magnetic recording medium 4 on the substrate 5B. The first bridge circuit consists of resistive elements $R_1$ and $R_2$ and magnet-resistive elements $R_{11}$ and $R_{12}$ on the opposite side, while the second bridge circuit consists of resistive elements $R_1$ and $R_2$ and magnet-resistive elements $R_{21}$ and $R_{22}$ on the opposite side. All the elements $R_{11}$, $R_{12}$, $R_{21}$ and $R_{22}$ are positioned adjacent to the magnetic recording medium 4. In this embodiment half the wave length of the magnetic signals recorded on the magnetic recording medium 4, i.e. the pitch of the magnetic poles, is P. The magnet-resistive elements $R_{11}$ and $R_{12}$ which are the components of the first bridge circuit are shifted by an odd integer multiple of P/4 from magnet-resistive elements $R_{21}$ and $R_{22}$ which are the components of the second bridge circuit. Further, magnet-resistive elements $R_{11}$ and $R_{21}$ are shifted by P/2 from magnet-resistive elements $R_{12}$ and $R_{22}$, respectively.

Figure 8:
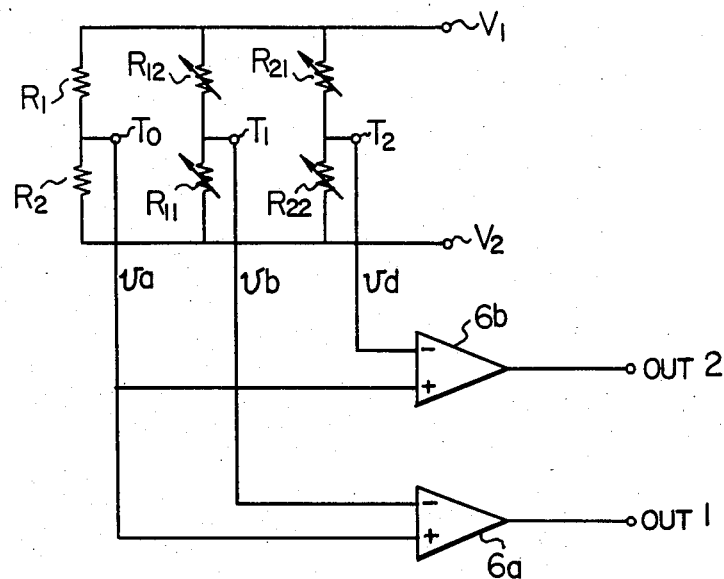
FIG. 8 is a diagram showing the circuit construction of the embodiment shown in FIG. 7.

In FIG. 8, since the magnet-resistive elements $R_1$ and $R_2$ are distant from the magnetic recording medium 4, the values of their magnetic resistance do not vary with the rotation of the magnetic recording medium 4. On the other hand, since the magnet-resistive elements $R_{11}$, $R_{12}$ and $R_{21}$, $R_{22}$ are adjacent to the magnetic recording medium 4, the values of their magnetic resistance vary with the rotation of the magnetic recording medium 4. Hence, outputs with a corresponding phase difference can be obtained between the terminals $T_0$ and $T_1$, and $T_0$ and $T_2$. Thus, when the detection terminals $T_0$ and $T_1$ are connected to a comparator, or an amplifier 6a, an output OUT 1 with a first phase related to the rotation of the rotating body 1 (cf. FIG. 1) is obtained. When the detection terminals $T_0$ and $T_2$ are connected to a comparator, or an amplifier 6b, an output OUT 2 with a second phase can be obtained.

Figure 9:
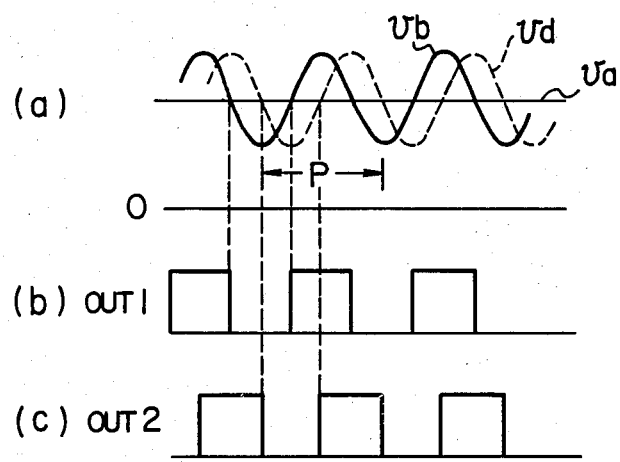
FIG. 9 shows wave forms at main parts of the circuit shown in FIG. 8.

This relation will be explained next in more detail by using FIG. 9. FIG. 9(a) shows wave forms of a voltage $v_a$ between the terminals $V_2$ and $T_0$, a voltage $v_b$ between the terminals $V_2$ and $T_1$, and a voltage $v_d$ between the terminals $V_2$ and $T_2$. The voltage $v_a$ is independent of the rotation of the rotating body 1 and is a d.c. voltage which does not vary with rotation. When the magnet-resistive element $R_{11}$ is under the influence of the maximum magnetic field of N or S pole of the magnetic recording medium 4, the value of its magnetic resistance decreases. At this moment, the magnet-resistive element $R_{12}$ lying at a position shifted by P/2 rom $R_{11}$ is not influenced by the magnetic field of the N or S pole. Therefore, the voltage $v_b$ becomes smaller than $v_a$. In this case, since the magnet-resistive elements $R_{21}$ and $R_{22}$ are lying in positions shifted by an equal distance from the center of N or S pole of the magnetic recording medium 4, they are subjected to a magnetic field of the same value. Therefore, the values of their magnetic resistance are decreased equally, and hence the voltage $v_d$ becomes equal to $v_a$. As the rotating body 1 rotates and the magnet-resistive element $R_{22}$ is subjected to the maximum magnetic field, the element $R_{11}$ feels no magnetic field. Then, the voltage $v_d$ becomes smaller than $v_a$. At this moment, since the magnet-resistive elements $R_{11}$ and $R_{12}$ are subjected to a magnetic field of the same value, the voltage $v_b$ becomes equal to $v_a$. As the rotating body 1 rotates further, the magnet-resistive element $R_{12}$ feels the maximum magnetic field while $R_{11}$ feels no magnetic field. Hence, the voltage $v_b$ becomes larger than $v_a$. Similar cycles as above are repeated. As a result, voltages $v_b$ and $v_d$ vary as shown in FIG. 9(a), giving two outputs with different phases. Since the values of magnetic resistance of the magnet-resistive elements are decreased by the magnetic fields of N and S poles in the same way, the frequency of the signals are twice as large as that of magnetic signals recorded in the magnetic recording medium 4. The output OUT 1 of the comparator 6a whose inputs are voltages $v_a$ and $v_b$ appears in the form of rectangular waves, only when the voltage $v_b$ is larger than $v_b$, as shown in FIG. 9(b). The output OUT 2 of the comparator 6b appears as shown in FIG. 9(c). Although, in FIG. 9, the output OUT 1 has an advanced phase by 90° with respect to the output OUT 2, this phase relation is reversed if the rotation direction of the rotating body 1 is reversed. Thus, the direction of rotation can be discriminated.

According to the embodiment of this invention performing the above-mentioned operation, the detection of rotation of a rotating body is possible. Furthermore, since magnet-resistive elements $R_1$ and $R_2$ placed in positions where their values of magnetic resistance do not vary with the rotation of the magnetic recording medium 4 are used as common sides of two bridge circuits, miniaturization of the MR element 5 can be realized. In the fabrication process of magnet-resistive elements, any irregularity of evaporation can be avoided, which facilitates an easy printing. This further helps the mass producibility much.

Although the above mentioned embodiment related to a case with two bridge circuits, it may also be applied to a multi-phase case with more than two bridge circuits with the same effect. For example, three bridge circuits may be prepared so that the phases of the output signals have a difference of 120° from each other by disposing the two magnet-resistive elements in each bridge circuit shifted by P/3 from each other.

Next, an example in which this invention is applied to a motor driving circuit will be explained with reference to FIGS. 10 to 16.

Figure 10:
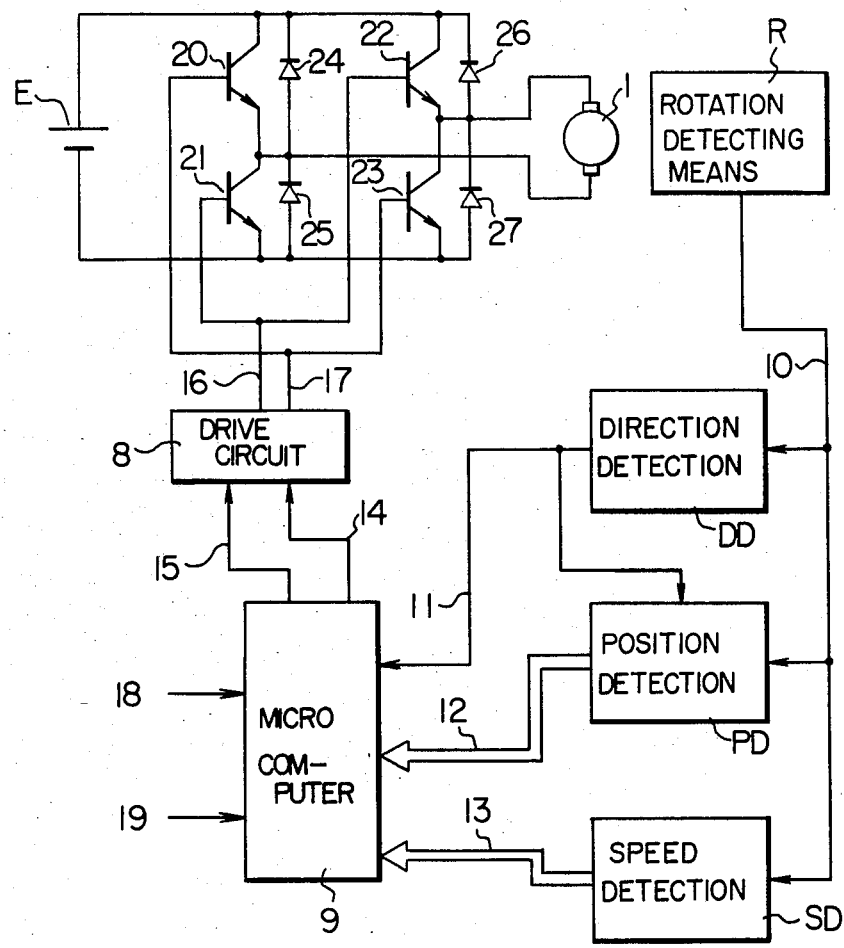
FIG. 10 is a circuit construction diagram showing one application example of this invention.

In FIG. 10, an H type bridge circuit of transistors 20, 21, 22 and 23 and another bridge circuit of diodes 24, 25, 26 and 27 are connected to a power supply E. Namely, the positive pole of the power supply E is connected with the collectors of transistors 20 and 22 and the cathodes of diode 24 and 26, while the negative pole is connected with the emitters of transistors 21 and 23 and the anodes of diode 25 and 27.

The emitter of transistor 20, the collector of transistor 21, the anode of diode 24 and the cathode of diode 25 are connected with the one terminal of a motor 1. The emitter of transistor 22, the collector of transistor 23, the anode of diode 26 and the cathode of diode 27 are connected with the other terminal of the motor 1. The shaft of the motor 1 is coupled to a rotation detecting means R of this invention. A revolution signal 10, or the output of the rotation detecting means R, is introduced into a rotation direction detecting circuit DD, a position detecting circuit PD and a speed detecting circuit SD.

A revolution direction signal 11, or the output of the rotation direction detecting circuit DD, is supplied to a microcomputer circuit 9 and the position detecting circuit PD. A position signal 12, or the output of the position detecting circuit PD, and a speed signal 13, or the output of the speed detection circuit SD are supplied also to the microcomputer circuit 9. Further, position instruction 18 and maximum speed instruction 19 are introduced to the microcomputer circuit 9 from external means. The microcomputer circuit 9 supplies a duty signal 14 and a forward-reverse rotation signal 15. A forward revolution output 16, or the output of a drive circuit 8, is supplied to the bases of transistors 21 and 22.

A reverse rotation output 17, or another output of the drive circuit 8, is supplied to bases of transistors 20 and 23.

The operation of the above construction is as follows.

First, a position instruction 18 and a maximum speed instruction 19 are given to the microcomputer circuit 9, which reads in the speed signal 13 for examining the speed of the motor 1 and also the position signal 12 for examining the position of the motor 1. After calculation, the microcomputer circuit 9 gives to the drive circuit 8 a duty signal 14 for determining a voltage to be given to the motor 1 and a forward-reverse rotation signal 15 for determining the rotation direction of the motor 1.

In the case of forward rotation, the drive circuit 8 gives the forward rotation output 16 to make transistors 21 and 22 conductive in accordance with the duty signal 14 and give a rotational force to the motor 1. At first, the position signal 12 of the motor 1 is different from the position instruction 18. This tends to increase the duty of the voltage given to the motor 1 and accelerate its rise time. As the speed of the motor 1 increases and the speed signal 13 approaches to the maximum instruction 19, the motor 1 generates a reverse rotation signal 17, in order to stop at the position instruction 18. As a result, transistors 20 and 23 are made conductive. This gives a damping force to the motor 1 so that the motor 1 may stop stably at the position instruction 18 as soon as possible.

Each block as shown in FIG. 10 will be explained in more detail next.

Figure 11:
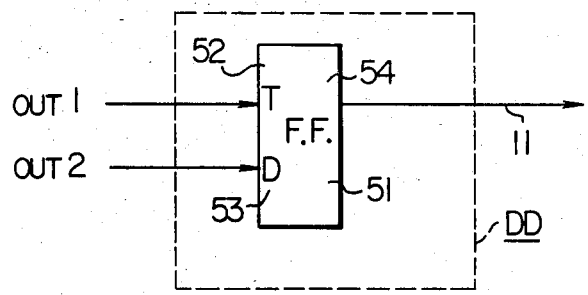
FIG. 11 is a detailed view of the main part of the circuit of FIG. 10.
Figure 12:
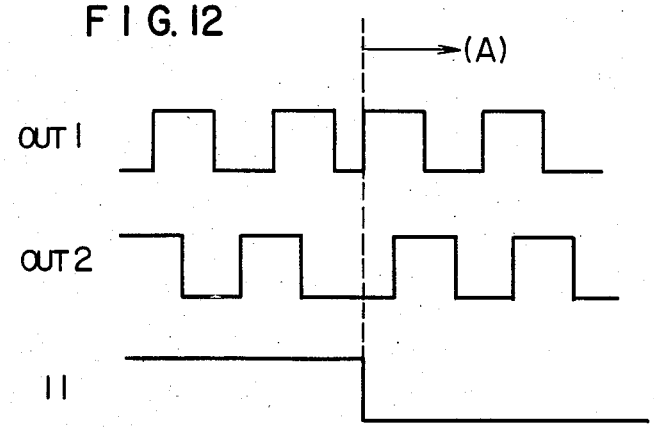
FIG. 12 shows wave forms for explaining the operation of the circuit of FIG. 11.

In the rotation direction detecting circuit DD shown in FIG. 11, a reference numeral 51 denotes a D type flip-flop. The one revolution signal OUT 1 of the rotation detecting means R shown in FIG. 9 is supplied to a clock terminal 52, while the other revolution signal OUT 2 is supplied to the input of a D terminal 53. The input of the clock terminal 52 works at the rising edge. The rotation direction signal 11, or the output of the flip-flop 51, is maintained at the level "1", as shown in FIG. 12, because if the revolution signal OUT 2 is advanced from the revolution signal OUT 1 of the two-phase outputs of the rotation detecting circuit R, the OUT 2 signal (input to the D terminal 53) is always at the "1" level when the OUT 1 signal (clock signal) rises. When the rotation direction changes and the revolution signal OUT 2 lags behind the revolution signal OUT 1, the OUT 2 signal (input to D terminal) is at the "0" level when the OUT 1 signal (clock input) rises as can be seen from FIG. 12(A). Thus, the revolution direction signal 11 from the output terminal 54 of the flip-flop 51 is set at the "0" level. In this manner, the rotation direction can be detected from the rotation direction detecting circuit 5.

Figure 13:
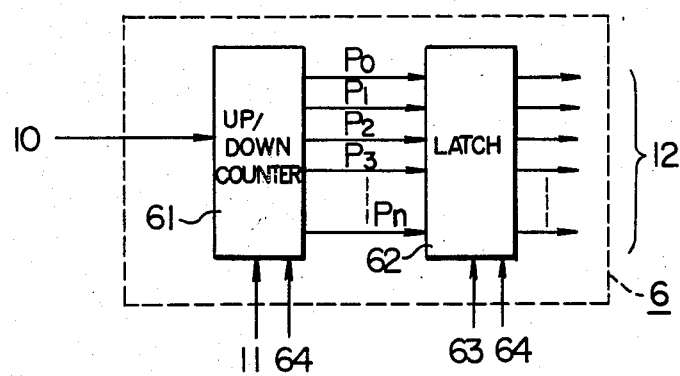
FIG. 13 is a detailed view of another main part of the circuit of FIG. 10.

Next, the position detecting circuit PD will be described in more detail with reference to FIG. 13.

Figure 14:
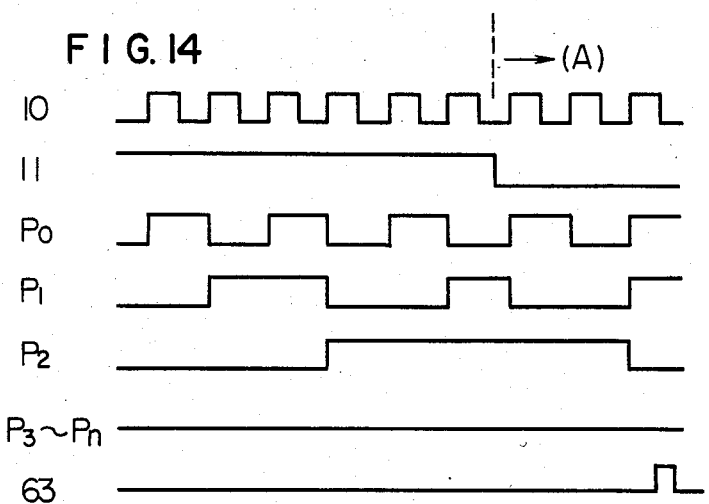
FIG. 14 shows wave forms for explaining the operation of the circuit of FIG. 13.

The circuit consists of an UP/DOWN counter 61 and a latch 62. The revolution signal 10 is used as a clock input to the UP/DOWN counter 61 while the revolution direction signal 11 is used as an UP/DOWN input. Outputs $P_0$ to $P_n$ of the UP/DOWN counter 61 are connected with the inputs of the latch 62. The position signal 12 is derived from the outputs of the latch 62. To a strobe terminal of the latch 62, a strobe signal 63 for latch is supplied. Further, the UP/DOWN counter 61 and the latch 62 have a reset terminal for receiving a reset input 64. The operation of the construction of FIG. 13 can be understood from time charts as shown in FIG. 14. The revolution signal 10 at the clock input is counted by the UP/DOWN counter 61. While the revolution direction signal 11 is at the "1" level, the counter 61 counts up as an UP counter, so that the counter output signals of the counter 61 vary as shown by $P_0$ to $P_2$. However, when the rotation of the motor 1 is reversed, the revolution direction signal 11 becomes "0" as shown in FIG. 14(A). The counter 61 counts down as a DOWN counter. The strobe signal 63 is supplied to the latch 62 at each prescribed time to latch the content of the UP/DOWN counter 61 and keep the position signal 12 always at a new value. At a moment when a new position instruction 18 is introduced into the microcomputer 9, both the UP/DOWN counter 61 and the latch 62 are reset by supplying a reset signal 64.

Figure 15:
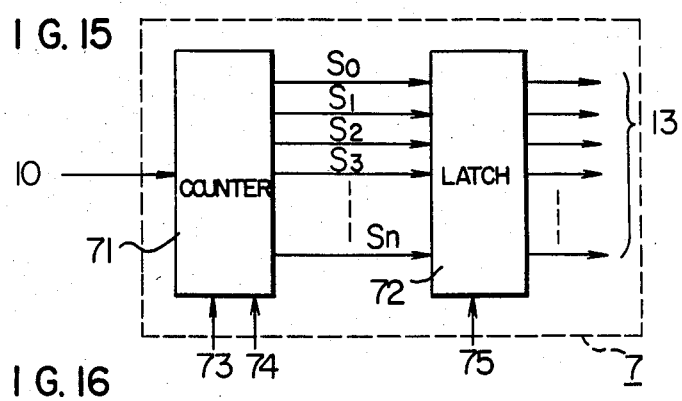
FIG. 15 is a detailed view of still another main part of FIG. 10.

The speed instruction circuit SD consists of a counter 71 and a latch 72, as shown in FIG. 15. The revolution signal 10 from the rotation detecting means R is supplied to the clock input of the counter 71, while a counter enable signal 73 with a prescribed period is supplied to an enable terminal. A counter reset signal 74 is supplied to a reset terminal. Output signals $S_0$ to $S_n$ of the counter 71 are the inputs to the latch 72. The outputs of the latch 72 constitute the speed signal 13. A latch strobe signal 75 is supplied to the latch 72.

Figure 16:
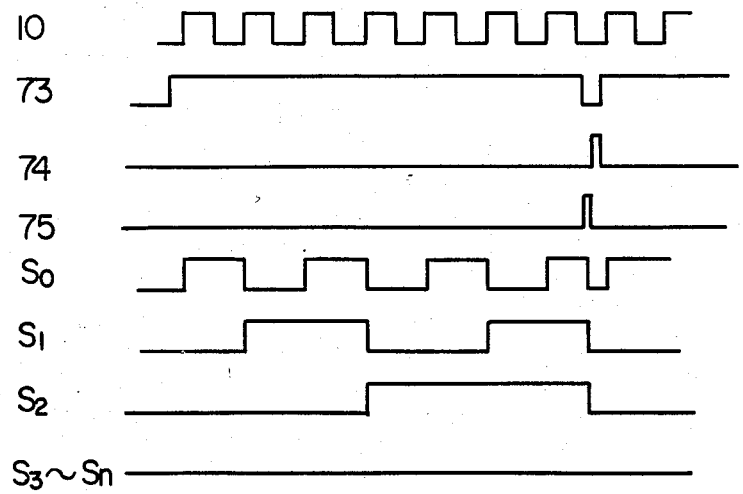
FIG. 16 shows wave forms for explaining the operation of the circuit of FIG. 15.

The operation of the circuit construction can be understood from time charts as shown in FIG. 16. The counter 71 continues to count the revolution signal 10 so long as the counter enable signal 73 is present, and generates output signals $S_0$ to $S_n$. By the latch strobe signal 75 of the latch 72, the content of the output signals $S_0$ to $S_n$ is latched. At a next moment, the counter 71 is reset by the counter reset signal 74 to prepare for following countings. Since the revolution signal 10 is counted for a prescribed period as determined by the presence of the counter enable signal 73, a value proportional to the speed of the motor 1 can be obtained as the speed signal 13.

The present invention may be applied to rotation control of various rotating bodies other than the above-mentioned examples.

As described before, this invention is also applicable to a case in which the record interval in the magnetic body 5B is extremely narrow; that is, the signal density is extremely large.

A further merit of this invention lies in the fact that the accuracy of forming the magnet-resistive elements is scarecely influenced by each pattern as formed on one chip, or by the method of formation.

In summary, this invention provide a rotation detecting means for a rotating body, in which even if the spacing between the MR element and the magnetic recording medium on a rotating body varies, the center voltage of the outputs at the terminals of the magnet-resistive elements is maintained at a constant level, and additionally the sensitivity of the output signals is increased. Therefore, the invention can enjoy an excellent effect.

Further, according to this invention, the number of magnet-resistive elements and terminals used for the formation of an MR element can be reduced. Therefore, the magnet-resistive element can be fabricated in a small size. This is effective in improving the mass producibility.

While the above described embodiments of the present invention have been generally directed to detection of rotation of a rotary body, it is understood that the same is not limited thereto, but is also directed generally to the detection of movement of a moving body in a manner as known to those skilled in the art. Accordingly, the present invention is not limited to the details shown and described, but is intended to cover all such changes and modifications as are encompassed by the scope of the appended claims.

What is claimed is:

1. A rotation detecting means for a rotating body comprising:

a rotating body whose rotation state is to be detected;

a magnetic recording medium which is fixed to said rotating body centering around the center axis of said rotating body, N and S magnetic poles being alternately recorded at a prescribed interval on said recording medium in the rotation direction of said rotating body;

at least two groups of magnet-resistive elements disposed at a fixed position opposite to said magnetic recording medium so that their values of resistance may vary with the action of said magnetic poles as recorded on said magnetic recording medium, the widths of said magnet-resistive elements in the rotation direction being made sufficiently smaller than the pitch P of said magnetic poles recorded on said magnetic recording medium, said each group having two branches that comprise one magnet-resistive element, said two branches being disposed at an interval of an odd integer multiple of a minimum interval of P/2 in the rotation direction; and low resistive parts comprising the parts which connect said two branches in series and the parts which connect said two groups in parallel to apply a prescribed voltage to each group so that output signals related to the rotation state of said rotating body may be derived from said connection parts of said two branches;

said magnet-resistive elements of each group being disposed in such a manner that the intervals between the groups of magnet-resistive elements are shifted from each other so that output signals have a phase difference.

2. A rotation detecting means for a rotating body according to claim 1 in which said magnet-resistive elements and said low resistive parts are formed by the same material and the widths of those parts other than the parts for forming said magnet-resistive elements are made large enough to have a low resistivity.

3. A rotation detecting means for a rotating body according to claim 1, in which the number of groups of said magnet-resistive elements are two and the magnet-resistive elements of the one group and the magnet-resistive elements of the other group are disposed in such a manner that the interval between said groups is equal to an odd number multiple of ¼ of the pitch P of said magnetic poles.

4. A rotation detecting means for a rotating body according to claim 1, further comprising voltage dividing resistive means for setting a reference voltage of each group commonly.

5. A rotation detecting means for a rotating body according to claim 4, in which said voltage dividing resistive means are formed by the same material as that of said magnet-resistive elements and disposed at positions free from the influence of said magnetic poles recorded on said magnetic recording medium.

6. A rotation detecting means for a rotating body according to claim 1 further comprising means responsive to the output signals having a phase difference for discriminating the rotation direction of said rotating body.

7. A rotation detecting means for a rotating body according to claim 1, wherein each group only has two branches, and each branch only has one magnet-resistive element therein.

8. An apparatus for detecting movement of a moving body comprising:

a moving body whose movement state is to be detected;

a magnetic recording medium fixed to the moving body, the magnetic recording medium having N and S magnetic poles alternately recorded thereon at a prescribed interval of pitch P in the movement direction of the moving body;

at least two groups of magnet-resistive elements disposed at a fixed position opposite to the magnetic recording medium so that the value of resistance of the magnet-resistive elements is variable in accordance with the action of the magnetic poles as recorded on the magnetic recording medium, the widths of the magnet-resistive elements in the movement direction being made sufficiently smaller than the pitch P of the magnetic poles recorded on the magnetic recording medium, each of the groups including two branches wherein each branch has at least one magnet-resistive element and the two branches being spaced from one another in the movement direction by an interval having a predetermined relationship to the Pitch P, the groups being spaced from one another in the movement direction by an interval less than the spacing of the interval between the two branches of each group, and the interval between the groups having a predetermined relationship to the pitch P, the two branches of each group being spaced by an interval of an odd integer multiple of a minimum interval of P/2 in the movement direction; and low resistivity path means for connection with the branches including low resistivity members for connecting the two branches of each group in series, and at least one low resistivity member for connecting the at least two groups in parallel, whereby upon application of a prescribed voltage to the groups, at least one output signal related to the movement state of the moving body may be derived from the low resistivity path means, the low resistivity path means including the low resistivity members enabling a prescribed voltage to be applied to each group so that output signal related to the movement state of the moving body may be derived from the low resistivity members connecting the two branches;

the magnet-resistive elements of each group being disposed in such a manner that the intervals between the groups of magnet-resistive elements are shifted from each other so that output signals have a phase difference.

9. An apparatus according to claim 8 wherein the number of groups of the magnet-resistive elements is two, and the magnet-resistive elements of each of group are disposed in such a manner that the interval between the groups is equal to an odd number multiple of ¼ of the pitch P.

10. An apparatus according to claim 8 wherein the magnet-resistive elements and the low resistive path means are formed by the same material, and the widths of the low resistive path means are made sufficiently large to have a low resistivity.

11. An apparatus according to claim 8, wherein the moving body is a rotating body, the magnetic recording medium being fixed to the rotating body centering around the center axis of the rotating body, and whereby the output signals are related to the rotation state of the rotating body.

12. An apparatus according to claim 8, further comprising voltage dividing resistive means for setting a reference voltage of each group commonly.

13. An apparatus according to claim 12, wherein the voltage dividing resistive means are formed by the same material as the material of the magnet-resistive elements, the voltage dividing resistive means being disposed at positions unaffected by the influence of the magnetic poles recorded on the magnetic recording medium.

14. An apparatus according to claim 8, wherein the moving body is a rotating body, and the output signals having a phase difference enable the discrimination of the rotating direction of the rotating body.

15. An apparatus according to claim 14, further comprising means responsive to the output signals having a phase difference for discriminating the rotation direction of the rotating body.

16. An apparatus according to claim 8, wherein each group only has two branches, and each branch has only one magnet-resistive element therein.

* * * * *